United States Patent [19]
Noroian

[11] 3,735,735
[45] May 29, 1973

[54] PORTABLE COMMODE FOR PETS EMPLOYING REMOVEABLE MAINTENANCE

[75] Inventor: George Noroian, Brooklyn, N.Y.

[73] Assignee: Michael Etkin, Howard Beach, Queens, N.Y. ; a part interest

[22] Filed: Apr. 14, 1971

[21] Appl. No.: 133,986

[52] U.S. Cl. ................................................. 119/1
[51] Int. Cl. ......................................... A01k 67/00
[58] Field of Search ........................................ 119/1

[56] References Cited

UNITED STATES PATENTS

| | | | |
|---|---|---|---|
| 2,671,427 | 3/1954 | Fell | 119/1 |
| 3,111,932 | 11/1963 | Knutson | 119/1 |
| 1,967,333 | 7/1934 | Smith | 119/1 |
| 2,390,854 | 12/1945 | Tompson | 119/1 |
| 3,482,546 | 12/1969 | Anderson | 119/1 |
| 2,230,861 | 2/1941 | Buehler | 119/1 |
| 3,339,527 | 9/1967 | Burroughs | 119/1 |
| 3,626,899 | 12/1971 | Spellman | 119/1 |

Primary Examiner—Aldrich F. Medbery
Attorney—Arthur L. Plevy

[57] ABSTRACT

There is disclosed a commode for animals particularly adapted for dogs. The commode comprises first and second rectangular box-like sections hinged together at one end. In an open position, the sections are positioned relatively perpendicular with respect to one another. The second section has legs on a bottom surface to permit the commode to rest above a floor. The top surface of the second section has an aperture thereon. In cooperation with the aperture is a bag holding apparatus which is positioned about the aperture, permitting a plastic or other type bag coacting therewith to rest between the space formed by the bottom surface of the second section and the floor. Animal droppings and so can easily be swept or raked into the aperture and hence confined within the plastic bag. The bag holding apparatus can then be easily removed, the bag and contents discarded and a new bag inserted.

9 Claims, 5 Drawing Figures

PATENTED MAY 29 1973 3,735,735
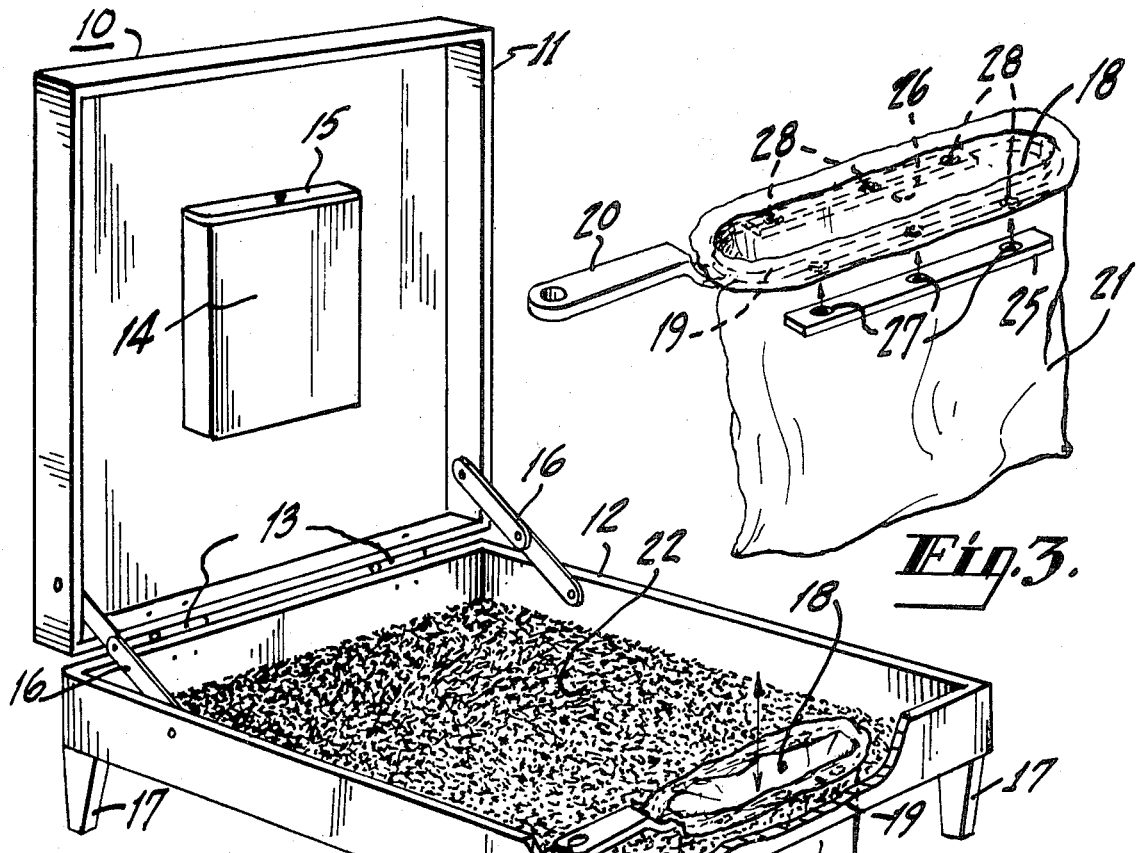
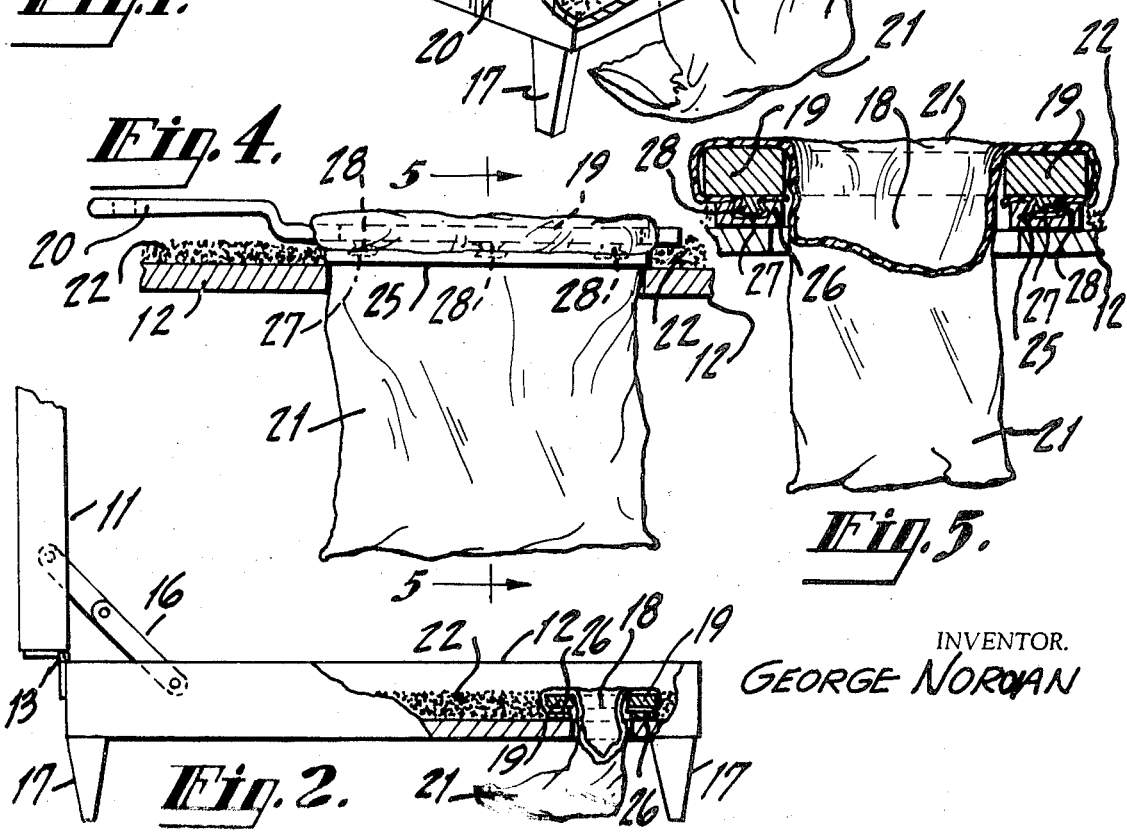
INVENTOR.
GEORGE NORMAN

PORTABLE COMMODE FOR PETS EMPLOYING REMOVEABLE MAINTENANCE

BACKGROUND OF INVENTION

The prior art discloses a plurality of animal commodes for many different purposes. A typical example of such commodes which are portable and easily handled is given in U.S. Pat. No. 2,671,427 entitled "Portable Animal Commode" issued on Mar. 9, 1954 to M. E. Fell. Such commodes have many advantages and associated disadvantages. The major difficulty with such commodes involves the difficulty in cleaning the same.

Presently, certain municipalities have passed legislation which prohibits the owner of a dog to walk the dog in the streets without thereafter cleaning or removing any of the waste products deposited by the animal during such a walk. Accordingly, many other cities and municipalities have indicated that their intention is to pass similar legislation. It has been found that most dog lovers understandably are quite reluctant to comply with the legislation and, therefore, have incurred fines, and further, the intent of the legislation has been circumvented. The problem arises in the difficulty in the gathering and suitable disposing of such waste products.

Accordingly, this invention relates to a portable animal commode particularly adapted for dogs. The commode comprises first and second box-like sections which are hinged together at one end and can be folded for easy storage and transport. In an open position, the top and bottom members are retained relatively perpendicular one to the other. The bottom member has legs thereon to enable the entire commode to be positioned above a floor or other suitable surface. This bottom section is further adapted to accommodate sawdust or a sand-like material which is suitably treated by a chemical whose scent is attractive to dogs. The sand accommodating surface of the commode also has located thereon an aperture or a slot. A bag holding apparatus comprises a loop and a handle member. The opening formed by the loop is of a similar shape but slightly larger than the aperture. The handle portion is attached to the loop and is used in lifting the same. The loop has means located thereon for accommodating a plastic bag. When the loop is accommodating the plastic bag, the bag protrudes into the space formed underneath the commode and due to the above-mentioned legs. After an animal has deposited droppings or waste products on the sandy surface, the same can be raked or swept into the aperture and hence confined within the plastic bag. Thereafter, the owner simply lifts the entire bag holding assembly by means of the handle, easily removes the plastic bag and thereafter inserts a new one.

BRIEF DESCRIPTION OF THE DRAWINGS

FIG. 1 is a plan view of an animal commode according to this invention;

FIG. 2 is a side view partly in section of the commode shown in FIG. 1;

FIG. 3 is a plan view of the bag holding apparatus according to this invention;

FIG. 4 is a side view of the apparatus shown in FIG. 3 and further accommodating a bag; and FIG. 5 is a sectional view taken through line 5—5 of FIG. 4.

DETAILED DESCRIPTION OF THE DRAWINGS

Referring to FIG. 1, numeral 10 shows a top tray or box-like section 11 and a bottom tray or box-like section 12. The trays 11 and 12 are conveniently hinged together by means of one or more hinges 13. Any suitable hinge assembly may be utilized and appropriately spaced. The trays 11 and 12 may be fabricated from a metal or a suitable plastic. The box-like structure is necessary in order to prevent leakage and to provide a material accommodating area. Shown attached to the top section 11 of the commode is a compartment 14 having a cover 15. The compartment 14 is utilized to carry additional sand or sawdust 22 for depositing on the top surface of the bottom section 12. The sand or sawdust 22 is uniformly distributed about the top surface and is preferably treated with a chemical which attracts dogs. This enables the owner of the dog to train the animal to attend to its needs within the confines of the bottom tray 12.

Also shown attached to the bottom surface of tray 12 are legs 17 which function to support the entire assembly and to raise the same above the surface of the floor. A bag retaining assembly includes a loop of material 19 which loop has a shape in accordance with the shape of the aperture 18 defining a discharge passage. The loop 19 thus formed is slightly larger than the aperture and has a handle portion 20 at one end thereof. The loop has means associated therewith for retaining and accommodating a plastic or other suitable bag 21. As shown in FIG. 2, the bag 21 can rest on the floor or other surface between the space formed thereby due to the action of the legs. The hinge members 16 serve to hold the top tray 11 and the bottom tray 12 in a relatively perpendicular position with respect to one another. Such members as 16 are well known in the art, and many suitable examples of the same can be found.

The operation and utility of the commode will be briefly described. When litter or waste products are deposited by the animal on the top surface of the tray 12, the owner by means of a rake or any other suitable device can then sweep the waste products towards the aperture. These products together with any soiled sawdust then fall through the aperture into the plastic bag 21 where they are confined. The owner can then lift the entire bag holding assembly 19 by means of handle 20 from the surface of the tray 12. He then can remove the bag and discard the same and easily insert a new bag.

Referring to FIG. 3, there is shown a more detailed configuration of the bag holding assembly. As indicated, a loop 19 is formed from a metallic or suitable plastic material. The inside dimensions of the loop are substantially congruent with the aperture. The width of the material used in forming the loop permits the loop assembly to rest on the top surface of the tray 12 as shown in FIG. 1. On the underneath surface of the loop material, there are located a series of snap assemblies or fastener assemblies 28. A plastic bag 21 is inserted within the loop and is folded around the loop whereupon two or more members as 26 and 27 having cooperating fastening members or snap members as 25 are snapped in position to cooperate with the fasteners 28 on the bottom surface of the loop 19. In this manner, the plastic bag as tucked or folded underneath the bottom surface is secured by the clamping action between the loop member 19 and the two or more clamp members 26 and 27.

FIG. 4 shows a side view of the assembly accommodating the bag. Accordingly, when the owner lifts the entire assembly by means of handle 20, he can easily snap off members 26 and 27, remove the bag and its contents, discard the same and easily insert a new bag. It is to be noted that the owner does not touch any portion of the assembly which the animal would have access to. Since the bottom clip members 26 and 27 are the only members that have to be touched by the owner, he also will not soil his hands on any portion of the apparatus which was exposed to the soiled sawdust.

As one can see from FIGS. 3, 4 and 5, the top portion of the loop 19 when inserted in the bottom tray 12 is entirely covered and protected by the plastic bag folded thereabout. Thus, there is provided a portable commode which is easy to clean and which further allows the dog owner to perform such cleaning operations without any danger of being exposed to any of the waste products dropped by the dog. This, therefore, contemplates a relatively sanitary apparatus. The commode may be conveniently stored as placed in a closet and so on. It can be used by apartment dwellers, kennels, veterinarians, and so on to permit animals to deposit their waste products while enabling easy cleaning.

The foregoing is considered as illustrative only of the principles of the invention. Further, since numerous modifications and changes will be readily apparent to those skilled in the art, it is not desired to limit the invention to the exact construction and operation shown and described; and accordingly, all suitable modifications may be resorted to only as limited by the scope and the breadth of the following claims.

What is claimed is:

1. An animal commode comprising,
   a. first and second rectangular members, each having a cover and a floor including a top surface and a bottom surface and side walls and end walls to thereby form an open "box-like" structure, said second member having an aperture located on a top surface thereof and contiguous with said bottom surface to form a discharge passage,
   b. a hinge assembly pivotally coupling said first and second members together at one of said end walls,
   c. a plurality of leg members coupled to the bottom surface of said second members to permit said commode to be positioned above a surface,
   d. an annular structure having an opening dimensioned to be substantially congruent to said aperture discharge passage of said second member, for surrounding the same when placed in congruency therewith,
   e. handle means fixedly coupled to said annular structure for lifting the same,
   f. a container means for confining animal waste products, and
   g. means coupling said container means to said annular structure to cause said container means to be positioned through said discharge passage when said annular structure is placed in congruency with said aperture.

2. The commode according to claim 1 further including,
   a. a layer of absorbent particle material dispersed over the top surface of said second member.

3. The commode according to claim 2 wherein said absorbent particle material is sawdust.

4. The commode according to claim 2, further comprising,
   a. a material accommodating compartment coupled to the top surface of said first member and adapted to store said absorbent particle material.

5. The animal commode according to claim 1 wherein said first and second members are fabricated from plastic.

6. The animal commode according to claim 1 wherein said annular structure has a series of fasteners located on the bottom surface thereof, and
   said means coupling said container means to said annular structure includes a rectangular member having fasteners on a surface thereof adapted to coact with and located with respect to said fasteners on the bottom surface of said annular structure for securing said container means between the bottom surface of said annular structure and said surface of said rectangular member.

7. The animal commode according to claim 1 wherein said container means comprises a plastic bag.

8. The animal commode according to claim 3 wherein said sawdust is treated with a chemical having an odor attractive to dogs.

9. The animal commode according to claim 1 further including,
   a. means coupled to corresponding side walls of said first and second members to securedly position the same in an open position relatively perpendicular one to the other.

* * * * *